United States Patent
Murayama et al.

(10) Patent No.: US 6,580,192 B2
(45) Date of Patent: Jun. 17, 2003

(54) STATOR COIL SUPPORT DEVICE FOR ELECTRIC ROTATING MACHINERY

(75) Inventors: Kiyoko Murayama, Kawasaki (JP);
Katsuhiko Yoshida, Yokohama (JP);
Noriyuki Iwata, Sagamihara (JP);
Hiroshi Hatano, Yokohama (JP);
Hiroyoshi Tsuchiya, Yokohama (JP);
Hisayuki Hirai, Chiba (JP); Toshiyuki Aso, Machida (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/867,446

(22) Filed: May 31, 2001

(65) Prior Publication Data

US 2002/0047456 A1 Apr. 25, 2002

(30) Foreign Application Priority Data

May 31, 2000 (JP) ........................................ 2000-163750

(51) Int. Cl.⁷ ................................................ H02K 3/48
(52) U.S. Cl. .................................................... 310/214
(58) Field of Search ............................... 310/214, 215, 310/91, 43, 42; 29/896–898

(56) References Cited

U.S. PATENT DOCUMENTS

| 984,182 | A | * | 2/1911 | Barr | ........................... 310/214 |
| 3,949,255 | A | | 4/1976 | Brown et al. | |
| 3,976,901 | A | * | 8/1976 | Liptak et al. | ................ 310/214 |
| 4,015,156 | A | * | 3/1977 | Johrde | ........................ 310/214 |
| 4,149,101 | A | | 4/1979 | Lesokhin et al. | |
| 4,547,690 | A | | 10/1985 | Bath et al. | |
| 4,994,700 | A | | 2/1991 | Bansal et al. | |
| 5,598,049 | A | * | 1/1997 | Meier | ......................... 310/214 |
| 5,854,525 | A | * | 12/1998 | Pommelet | ................... 310/214 |
| 6,218,756 | B1 | * | 4/2001 | Gardner et al. | ............. 310/214 |

FOREIGN PATENT DOCUMENTS

| CA | 1 095 108 | 2/1981 |
| DE | 1 513 780 | 10/1969 |
| DE | 36 12 112 | 10/1987 |
| GB | 2 268 337 | 1/1994 |
| JP | 61-247256 | 11/1986 |

\* cited by examiner

*Primary Examiner*—Tran Nguyen
(74) *Attorney, Agent, or Firm*—Oblon, Spivak, McClelland, Maier & Neustadt, P.C.

(57) ABSTRACT

An electric rotating machinery is provided with a stator coil support device, which comprises a stator core provided with a slot having an opening, a stator coil installed in the slot of the stator core, a wedge member disposed so as to close the opening of the slot of the stator core, and an elastic plate member inserted between the stator coil and the wedge member. The wedge member is formed so as to have an inclination towards an axial direction of the stator core and the elastic plate member has a structure undulating towards the axial direction.

15 Claims, 7 Drawing Sheets

STATOR COIL SUPPORT DEVICE FOR ELECTRIC ROTATING MACHINERY

BACKGROUND OF THE INVENTION

The present invention relates to a stator coil support device of an electric rotating machinery wherein an elastic member is inserted between a stator coil and a wedge.

In the most recent electric rotating machineries such as turbine generators, it becomes possible to increase capacity (output) thereof, as compared with the prior art, in accordance with the progressing of cooling technology.

However, increasing capacity of turbine generators has brought about an abrupt increase in a current flowing in the stator coil. Consequently, electromagnetic vibrations of double frequency are generated in the slot of the stator core in which the stator core is installed during a normal operation, and in the event of an abnormal operation at a time, for example, when a short circuiting or like occurs, excessive transient electromagnetic force is generated.

In a conventional turbine generator, such abnormal phenomenon has been dealt with by adopting a structure shown in FIGS. 16 to 19 for the stator coil support device.

Figure 16:
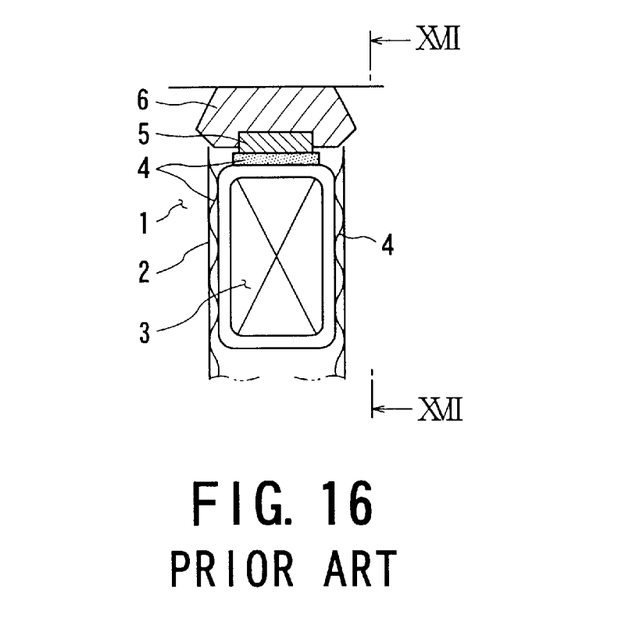
FIG. 16 is a front view illustrating one example of a conventional stator coil support device for an electric rotating machinery.
Figure 17:
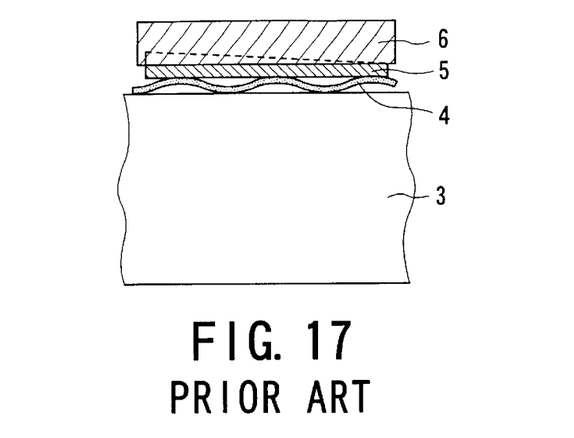
FIG. 17 is a side view seen from the direction of arrows XVII—XVII of FIG. 16.
Figure 18:
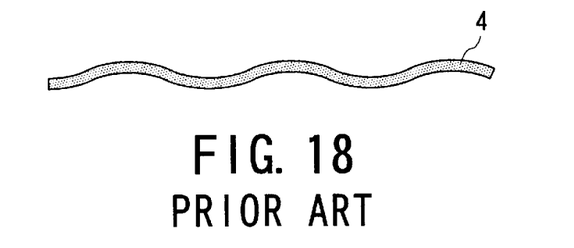
FIG. 18 is a front view illustrating another example of a conventional elastic plate applied to a stator coil support device for an electric rotating machinery.
Figure 19:
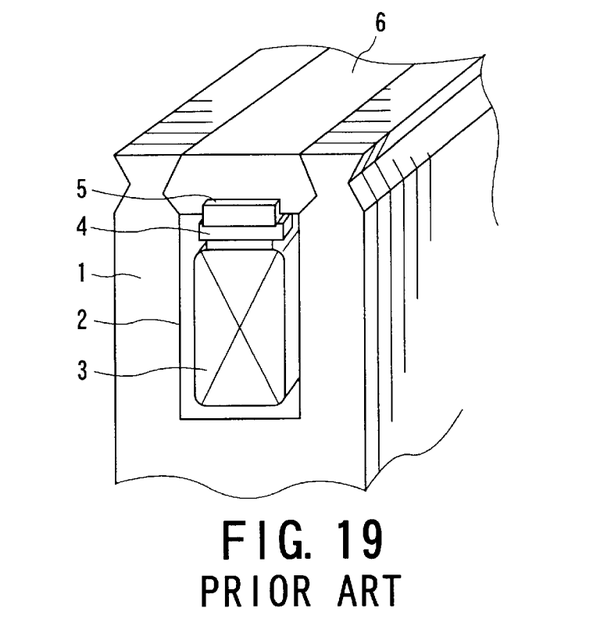
FIG. 19 is a perspective view illustrating a further example of a conventional stator coil support device for an electric rotating machinery.

With reference to FIGS. 16 to 19, in the stator coil support device, a stator coil 3 is installed in a slot 2 of a stator core 1 constituted by superimposing thin sheets, for example, sheets of silicon steel, along an axial direction thereof and, at one end of the stator coil 3 installed in the slot 2, as shown by way of example in FIGS. 16 to 18, the slot 2 has an opening which is closed by a wedge 6 having inclined surfaces, with an elastic plate 4 and a sliding plate 5 formed with an inclined shape being inserted. The elastic plate 4 is called a ripple spring formed as an undulating (wave-shaped) laminated plate formed through a hot press forming process of a thermosetting resin such as phenol or epoxy resin with cotton or glass cloth etc being as base material. The electromagnetic vibrations generated during the operation are arranged to be suppressed by skillfully utilizing the elastic force due to the undulations of the elastic plate 4.

Further, in a conventional stator coil support device, the electromagnetic vibrations are suppressed in the same way as described above by mounting the elastic plate 4 as shown in FIG. 18 also on the side surface of the stator coil 3 shown in FIG. 16 with an insulating layer, not shown, being inserted.

In this way, in a conventional stator coil support device, the electromagnetic vibrations have been suppressed, and a damage to the insulating layer has been prevented by the elastic force of the undulation (wave-shape) of the elastic plate 4 which is inserted in the gap between the wedge 6 and the stator coil 3 installed in the slot 2 of the stator core 1 and, in addition, the electrical loss or like that accompanies the formation of the gap has been also prevented.

Although the prior art stator coil support device shown in FIGS. 16 to 19 is excellent in the point of well suppressing electromagnetic vibrations generated in the slot of the stator core, the prior art still provided the following problems.

In order to suppress vibrations of the stator coil 3, the conventional stator coil support device requires the elastic plate 4, the sliding plate 5 and the wedge 6, as described above.

However, if the structural components of the stator coil support device become large in number, the time required for assembling the components increases and more time is spent in the assembling operation, which has repercussions on costs, leading to a problem of high cost. In particular, in regard to the structural components employed in the stator coil support device, it is required for a worker to make simple the operation due to the fact that the assembling operation is generally performed in a restricted location.

SUMMARY OF THE INVENTION

An object of the present invention is to substantially eliminate defects or drawbacks encountered in the prior art mentioned above and to provide a stator coil support device for an electric rotating machinery (rotary electric machine) in which simplification of the assembling operation is achieved by reducing the number of structural components.

This and other objects can be achieved according to the present invention by providing, in one aspect, a stator coil support device for an electric rotating machinery, comprising:

a stator core provided with a slot having an opening;

a stator coil installed in the slot of the stator core;

a wedge member disposed so as to close the opening of the slot of the stator core; and an elastic member inserted between the stator coil and the wedge member, wherein the wedge member is formed so as to have an inclination towards an axial direction of the stator core and the elastic member has a structure undulating towards the axial direction.

In another aspect, there is provided a stator coil support device for an electric rotating machinery, comprising:

a stator core provided with a slot having an opening;

a stator coil installed in the slot of the stator core;

a wedge member disposed so as to close the opening of the slot of the stator core; and an elastic member inserted between the stator coil and the wedge member, wherein the wedge member is formed so as to have an inclination towards an axial direction of the stator core, the elastic member has a recess, in cross-section, at a central portion thereof, and flanges are provided on both sides of the recess in an inclined manner towards the axial direction.

In a further aspect, there is also provided a stator coil support device for an electric rotating machinery, comprising:

a stator core provided with a slot having an opening;

a stator coil installed in the slot of the stator core;

a wedge member disposed so as to close the opening of the slot of the stator core; and an elastic member inserted between the stator coil and the wedge member, wherein the wedge member is formed so as to have an inclination towards an axial direction of the stator core and the elastic member is formed as a split cylinder structure having an inclination towards the axial direction of the stator core.

In a still further aspect, there is also provided a stator coil support device for an electric rotating machinery, comprising:

a stator core provided with a slot having an opening;

a stator coil installed in the slot of the stator core;

a wedge member disposed so as to close the opening of the slot of the stator core; and an elastic member inserted between the stator coil and the wedge member, wherein the wedge member is formed so as to have an inclination towards an axial direction of the stator core and the wedge member is formed so as to have an inclination towards the axial direction and provided with ratches on the inclined side, and wherein the elastic member has a plate structure having a recess, in a cross-section, at a central portion thereof, flanges are provided on both sides of the recess and ratches are provided on the flanges, which are formed in an inclined manner towards the axial direction.

In a still further aspect, there is provided a stator coil support device for an electric rotating machinery, comprising:

a stator core provided with a slot having an opening;
a stator coil installed in the slot of the stator core;
a wedge member disposed so as to close the opening of the slot of the stator core; and
an elastic member inserted between the stator coil and the wedge member,
wherein the elastic member has a recess, in cross section, into which said wedge member is fitted.

In a still further aspect, there is also provided a stator coil support device for an electric rotating machinery, comprising:

a stator core provided with a slot having an opening;
a stator coil installed in the slot of the stator core;
a wedge member disposed so as to close the opening of the slot of the stator core; and
an elastic member inserted between the stator coil and the wedge member,
wherein the elastic member is provided with a recess, in cross-section, which is formed with a side to be engaged with a groove formed to the wedge member.

In a still further aspect, there is also provided a stator coil support device for an electric rotating machinery, comprising:

a stator core provided with a slot having an opening;
a stator coil installed in the slot of the stator core;
a wedge member disposed so as to close the opening of the slot of the stator core; and
an elastic member inserted between the stator coil and the wedge member,
wherein the stator coil in the slot of the stator core is covered by the elastic plate with said wedge interposed therebetween, the elastic member is provided with a recess, in cross-section, and flanges are provided on both sides of the recess to be engaged with a groove formed to both slot sides of the stator core.

In preferred embodiments of some of the above aspect, the elastic member has a plate structure having at least one wave-peak, and in a certain case, the elastic member has a plurality of wave-peaks which have heights gradually increasing along the axial direction of the stator core.

The wedge member has an inclination towards the axial direction of the stator core in a range of not less than 0° but not more than 10°. The elastic member has a plate structure having an inclination towards the axial direction of stator core in a range of not less than 0° but not more than 10°.

The recess is formed in a trapezoidal shape. The wedge member is formed in a polygonal shape so as to be fitted into the recess formed in the elastic member by utilizing sides of the polygonal shape.

The elastic member has a plate structure made of glass fiber reinforced plastic material. The elastic member has a plate structure made of non-magnetic stainless-steel material.

According to the stator coil support device for the electric rotating machinery according to the present invention of the aspects and characters mentioned above, the stator coil installed in the slot of the stator core can be supported by the wedge with the elastic plate being inserted. Therefore, the number of structural components can be reduced, so that the assembling operation can be facilitated, thus making it possible to shorten the time required for the assembling operation compared with the conventional technology.

The nature and further characteristic features of the present invention will be made more clear from the following descriptions made with reference to the accompanying drawings.

DESCRIPTION OF THE PREFERRED EMBODIMENTS

Hereunder, embodiments of a stator coil support device of an electric rotating machinery according to the present invention will be described by way of preferred examples with reference to the accompanying drawings.

Figure 1:
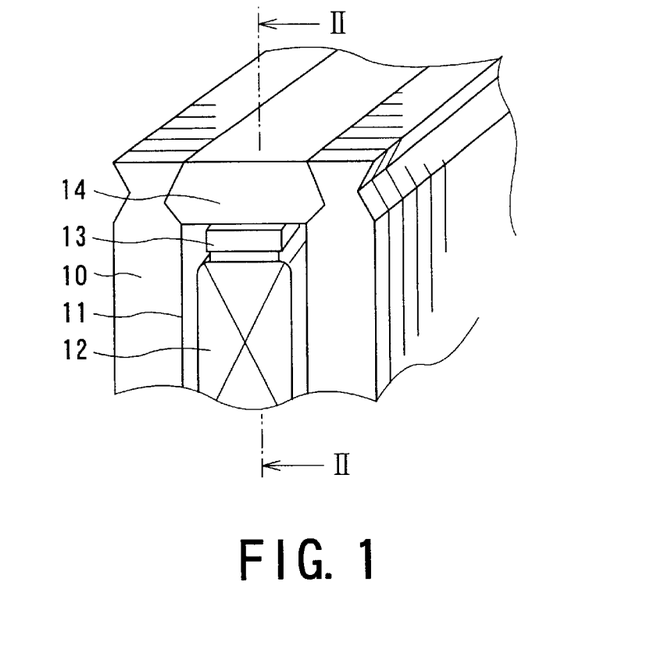
FIG. 1 is a perspective view illustrating a first embodiment of a stator coil support device for an electric rotating machinery according to the present invention.
Figure 2:
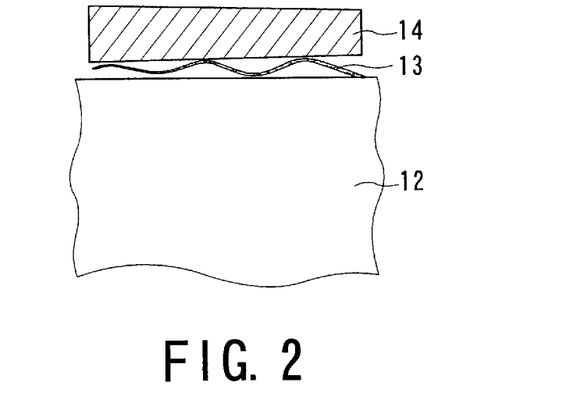
FIG. 2 is a schematic longitudinal section taken along the line II—II of FIG. 1.
Figure 3:
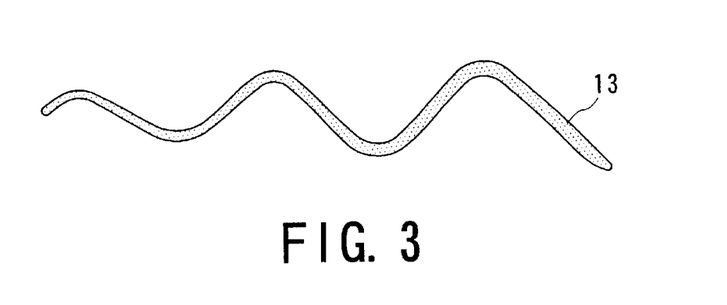
FIG. 3 is a view illustrating an elastic plate employed in a first embodiment of a stator coil support device for an electric rotating machinery according to the present invention.

FIG. 1 to FIG. 3 are diagrams illustrating a first embodiment of a stator coil support device for an electric rotating machinery according to the present invention.

With reference to FIGS. 1 to 3, the stator coil support device for an electric rotating machinery according to this embodiment has a construction in which a stator coil 12 is installed in a slot 11 of a stator core 10 formed by overlaying thin sheets, for example, silicon steel sheets, along the axial direction of the stator core 10, and an opening of the is closed by a wedge (wedge means) 14 having an inclined surface with the elastic plate 13 being inserted at one end of the stator coil 12 in a manner shown in FIG. 2.

The elastic plate 13 is formed, through a hot pressing of thermosetting resin such as phenol or epoxy resin, by using, as a base material, cotton or glass cloth as shown in FIG. 3. The elastic plate 13 has at least one peak (mount portion) so that peaks are formed by using an undulating (wave-shaped) laminated plate so as to be increased in height in the axial direction of the stator core. Further, the elastic plate 13 may be manufactured or made of glass fiber reinforced plastic material or non-magnetic stainless steel material.

As shown in FIG. 2, the wedge 14 is manufactured through a molding process with an angle of inclination such that its thickness decreases in the axial direction of the stator core. This angle of inclination is not less than 0° and not more than 10°. This numerical range is a preferred applicable range which was determined through experiment.

In this embodiment, the stator coil 12 is supported by the wedge 14 which is molded and processed with an angle of inclination so as to decrease its thickness in the axial direction thereof, and the undulating (wave-shaped) laminated elastic plate 13 having at least one or more peaks, which become higher in the axial direction, is inserted. Accordingly, even if electromagnetic vibration is generated in the stator coil 12, the elastic force of the elastic plate 13 having at least one or more peaks and the frictional force that accompanies the increase in contact area of the wedge 14 formed with such angle of inclination as mentioned above can be effectively utilized, thereby enabling the vibration to be suppressed.

Furthermore, in this embodiment, the elastic plate 13 among the elastic plate 13 and the wedge 14 which support the stator coil 12 is molded and processed with at least one or more peaks so as to become higher in the axial direction, and, on the other hand, the wedge 14 is molded and processed so as to become thinner in the axial direction. Accordingly, the number of structural components can be reduced, and, as well as control of vibration, the assembling operation can be facilitated, thereby enabling the time required for the assembling operation to be shortened compared with the conventional technology.

Figure 4:
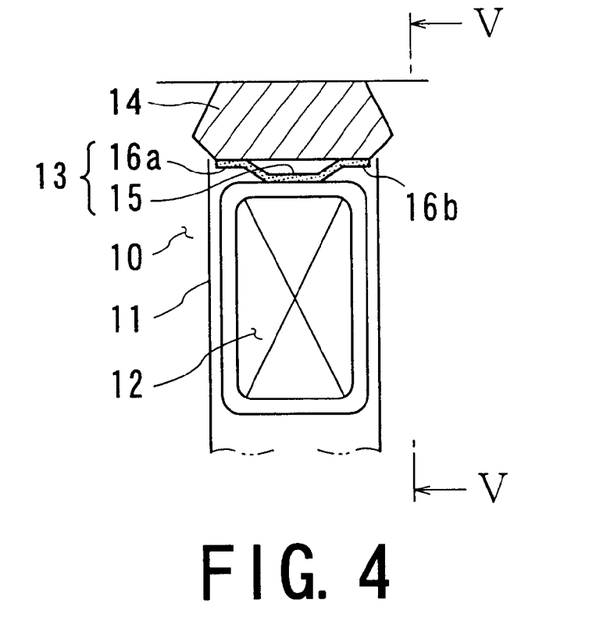
FIG. 4 is a front view illustrating a second embodiment of a stator coil support device for an electric rotating machinery according to the present invention.
Figure 5:
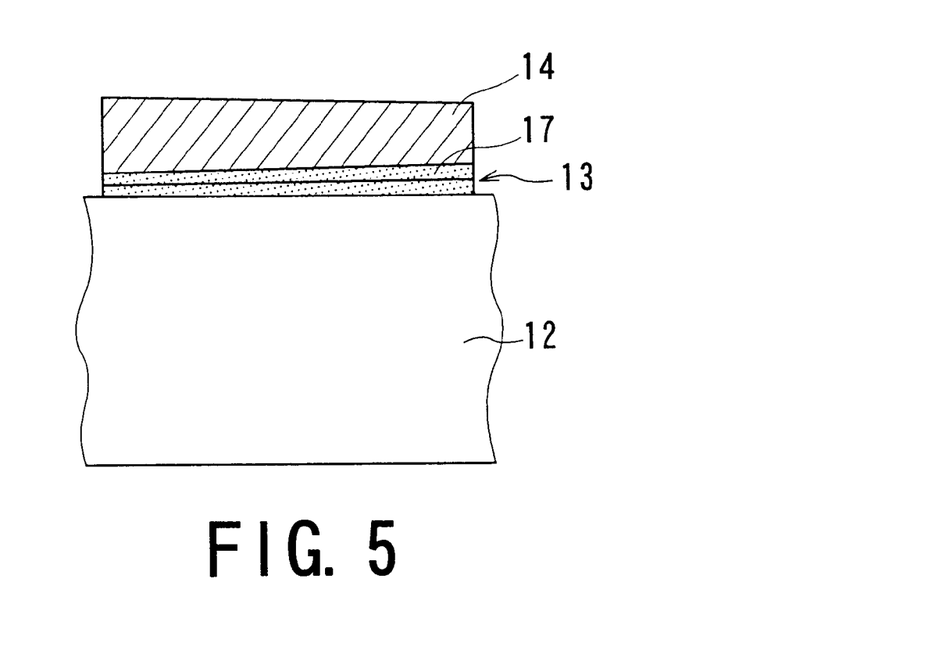
FIG. 5 is a side view seen in the direction of arrows V—V of FIG. 4.
Figure 6:
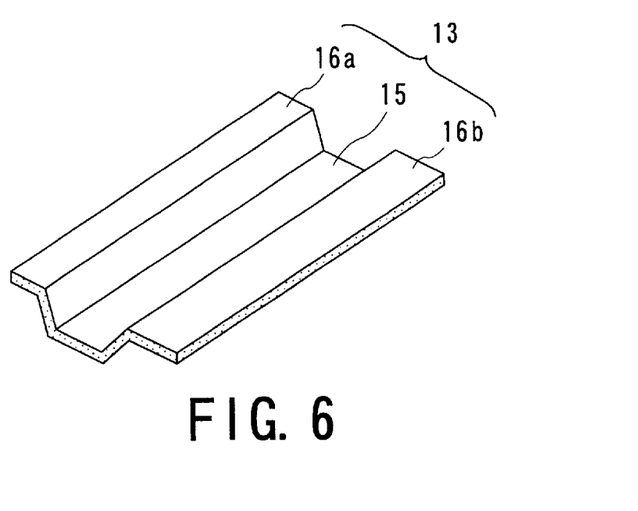
FIG. 6 is a perspective view illustrating an elastic plate applied to a second embodiment of a stator coil support device for an electric rotating machinery according to the present invention.

FIG. 4 to FIG. 6 are views representing a second embodiment of a stator coil support device for an electric rotating machinery according to the present invention, in which like reference numerals are added to portions or components corresponding to those of the first embodiment and the details thereof are omitted herein.

In the stator coil support device for an electric rotating machinery according to this second embodiment, the stator coil 12 that is installed in the slot 11 of the stator core 10 is supported by the elastic plate 13 and the wedge 14, as well shown in FIG. 6. The elastic plate 13 is formed with at least one or more recesses 15 at a central portion having a trapezoidal shape in its cross sectional area, and flat flanges 16a, 16b are provided on both sides thereof. As shown in FIG. 5, the elastic plate 13 is molded and processed with an inclined side 17 having an angle of inclination of not less than 0° and not more than 10° with respect to the axial plane.

Furthermore, as shown in FIG. 5, the wedge 14 is molded and processed with an angle of inclination of not less than 0° and not more than 10° towards the axial direction so as to accord with the inclined side 17 of the elastic plate 13.

Thus, in this embodiment, the elastic plate 13 is molded and processed so as to be provided with at least one or more trapezoidal recesses 15 at the central portion thereof, and the flat flanges 16a, 16b are formed on both sides thereof with an inclined side 17 having an angle of inclination of not less than 0° and not more than 10° with respect to the axial plane. On the other hand, the wedge 14 has an angle of inclination of not less than 0° and not more than 10° in the axial direction so as to accord with the shape of elastic plate 13. Accordingly, the number of structural components can be reduced, and moreover, in accordance with the increase in compressive force with respect to external force from outside at a time of molding the recess 15 of the elastic plate 13, the assembling operation can be facilitated and the time required for the assembling operation can be shortened compared with the conventional technology.

Figure 7:
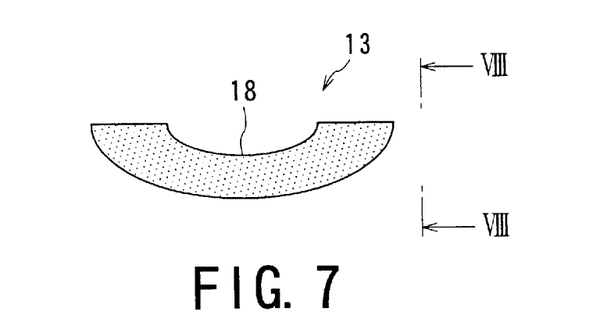
FIG. 7 is a view illustrating a modified example of the elastic plate applied to the stator coil support device.
Figure 8:
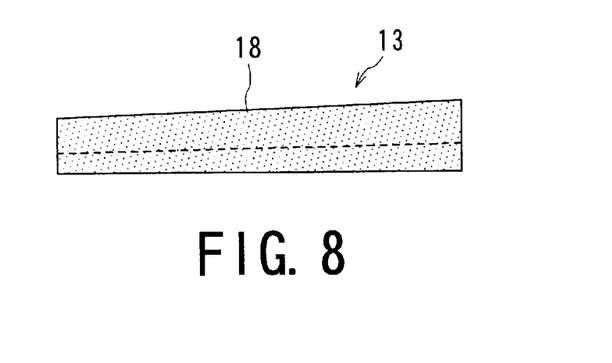
FIG. 8 is a side view seen in the direction of arrows VIII—VIII of FIG. 7.
Figure 9:
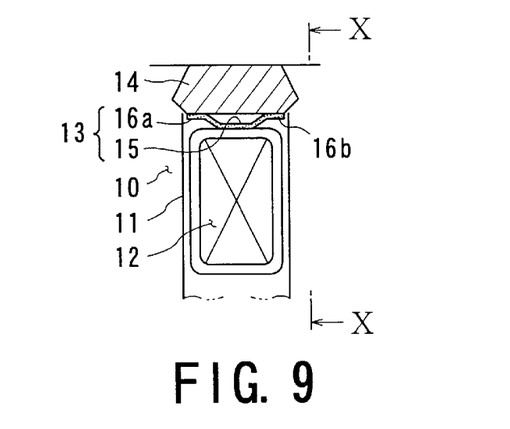
FIG. 9 is a front view illustrating a third embodiment of a stator coil support device for an electric rotating machinery according to the present invention.

Although, in the described embodiment, the trapezoidal recess 15 is formed at the central portion of the cross-section of the elastic plate 13 and the flat flanges 16a and 16b are provided on both sides thereof, there is no restriction to this example, and for example, as shown in FIG. 7, it could be molded and processed into a split-type cylinder 18 with an inclined surface having an angle of inclination in the range of 0° to 10° in the axial direction as shown in FIG. 8.

FIG. 9 to FIG. 12 are views representing a third embodiment of a stator coil support device for an electric rotating machinery according to the present invention, in which like reference numerals are added to portions or components corresponding to those of the first embodiment and the details thereof are omitted herein.

Figure 11:
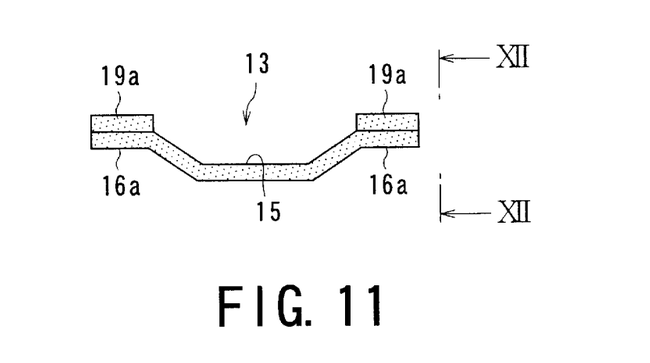
FIG. 11 is a view illustrating the elastic plate applied to the third embodiment of a stator coil support device.
Figure 12:
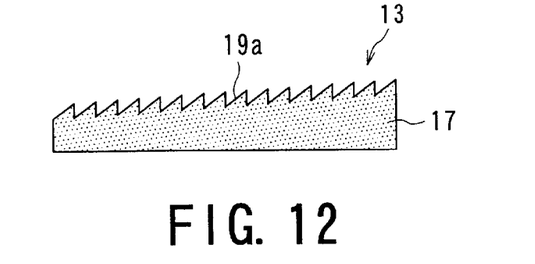
FIG. 12 is a side view seen in the direction of arrows XII—XII of FIG. 11.

In a stator coil support device for an electric rotating machinery according to this third embodiment, at a time of supporting the stator coil 12 installed in the slot 11 of the stator core 10 by interposing the elastic plate 13 and the wedge 14 which are shown in FIG. 11, the elastic plate 13 is formed with at least one or more trapezoidal recesses 15 at the central portion of its cross-section, and flat flanges 16a, 16b are provided on both sides thereof. As shown in FIG. 12, the elastic plate 13 is molded with an inclined side 17 having an angle of inclination of not less than 0° and not more than 10° with respect to the axial plane, and furthermore, is formed with a ratchet-like ratches 19a to the flanges 16a, 16b.

Figure 10:
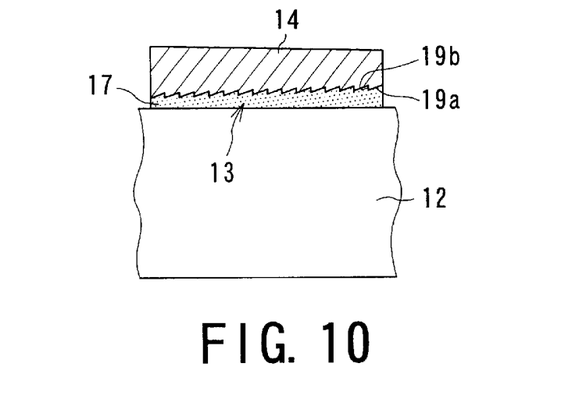
FIG. 10 is a side view seen in the direction of arrows X—X of FIG. 9.

As shown in FIG. 10, the wedge 14 is molded so as to provide an angle of inclination of not less than 0° and not more than 10° in the axial direction so as to accord with the inclined side 17 of the elastic plate 13 and is formed with the ratchet-like ratches 19b so as to accord with the flanges 16a, 16b of the elastic plate 13.

According to the manner mentioned above, in the present embodiment, the elastic plate 13 in the elastic plate 13 and the wedge 14 which support the stator coil 12 is provided with at least one or more trapezoidal recesses 15 in cross-section and the ratches 19a are provided in the flat flanges 16a, 16b on both sides thereof. On the other hand, the wedge 14 has an angle of inclination of not less than 0° and not more than 10° in the direction of the axial plane so as to accord with the shape of the elastic plate 13 and is equipped with the ratches 19a. Accordingly, the number of structural components can be reduced and, as a result, the assembling operation can be facilitated while preventing the separation of the elastic plate 13 from the wedge 14 through the engagement of the ratches 19a of the elastic plate 13 with the ratches 19b of the wedge 14. Thus, the time required for the assembling operation can be shortened compared with the conventional technology.

Figure 13:
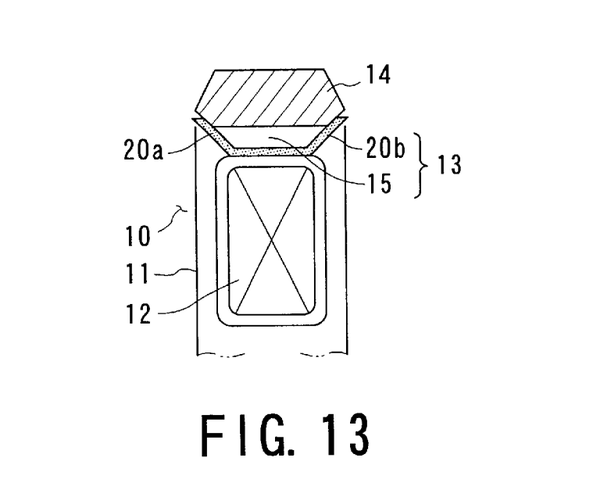
FIG. 13 is a front view illustrating a fourth embodiment of a stator coil support device for an electric rotating machinery according to the present invention.

FIG. 13 is a diagram illustrating a fourth embodiment of a stator coil support device for an electric rotating machinery according to the present invention, in which like reference numerals are added to portions or components corresponding to those of the first embodiment and the details thereof are omitted herein.

In the stator coil support device for an electric rotating machinery according to this fourth embodiment, the stator coil 12 installed in the slot 11 of the stator core 10 is supported by the elastic plate 13 and the wedge 14, and the elastic plate 13 is formed with trapezoidal recesses 15 in its cross-sectional plane. The wedge 14 is fitted by utilizing the polygonal shapes having a large number of sides such as, for example, hexagonal shapes on sides 20a and 20b of the recess 15.

Thus, in this fourth embodiment, the elastic plate 13 in the elastic plate 13 and the wedge 14 which support the stator coil 12 has the cross-section formed as a trapezoidal recess 15, and the wedge 14 is fitted by utilizing the side of the polygonal shape of the recess 15, thus reducing the number of structural components. Consequently, the assembling operation can be facilitated and the time required for the assembling operation can be shortened compared with the conventional technology.

Figure 14:
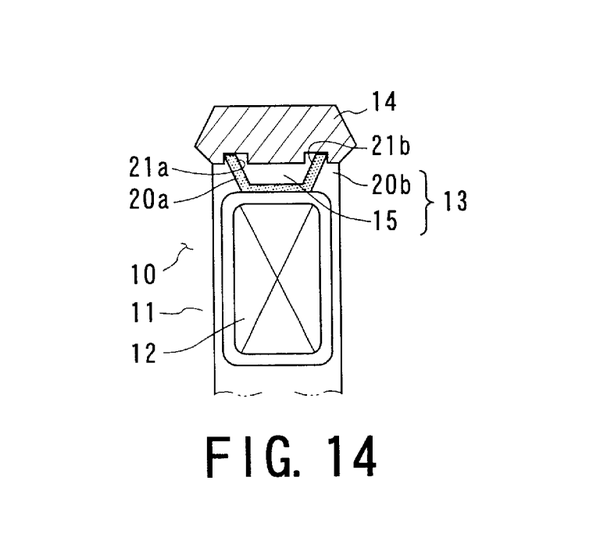
FIG. 14 is a front view illustrating a first modified example of the fourth embodiment of a stator coil support device for an electric rotating machinery.
Figure 15:
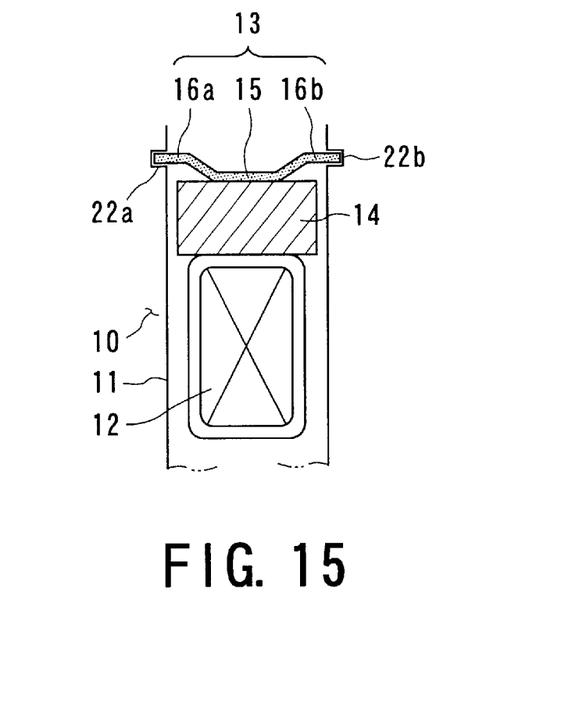
FIG. 15 is a front view illustrating a second modified example of the fourth embodiment of a stator coil support device.

Although, in this embodiment, the polygonal wedge 14 having a large number of sides is fitted to the elastic plate 13 provided with the trapezoidal recess 15, the present invention is not limited to such example, and for instance, as shown in FIG. 14, it would be possible to mold the elastic plate 13 having the recess 15 to be comparatively small in size and to engage the sides 20a, 20b of the elastic plate 13 with the grooves 21a, 21b formed in the polygonal wedge 14. Alternatively, for example, as shown in FIG. 15, the wedge 14 can be inserted to the stator coil 12 and supported by being subjected to pressure on the stator coil 12 from the elastic plate 13 formed with the trapezoidal recess 15 at the central portion of its cross-section, with the flanges 16a, 16b being provided on both sides thereof so as to be engaged with the grooves 22a, 22b of the stator core 10.

All the examples are beneficial in that the number of structural components is reduced and, hence, facilitates the assembling operation, and the spatial distance in the vertical direction of the stator coil 12 and the slot 11 is reduced, thereby enabling the conductor installing area ratio of the stator coil 12 to be increased.

Further, it is to be noted that the present invention is not limited to the described embodiments and many other changes and modifications may be made without departing from the scopes of the appended claims.

What is claimed is:

1. A stator coil support device for an electric rotating machinery, comprising:
    a stator core provided with a slot having an opening;
    a stator coil installed in the slot of the stator core;
    a wedge member disposed so as to close the opening of the slot of the stator core; and
    an elastic member inserted between the stator coil and the wedge member, wherein,
    said wedge member has a radial thickness formed so as to have an inclination towards an axial direction of the stator core, and
    said elastic member has a structure undulating towards the axial direction and is configured as a plate structure having at least one wave-peak.

2. A stator coil support device for an electric rotating machinery according to claim 1, wherein said elastic member has a plate structure having a plurality of wave-peaks which have heights gradually increasing along the axial direction of the stator core.

3. A stator coil support device for an electric rotating machinery according to claim 1, wherein said wedge member has an inclination towards the axial direction of the stator core substantially between 0° and 10°.

4. A stator coil support device for an electric rotating machinery, comprising:
    a stator core provided with a slot having an opening;
    a stator coil installed in the slot of the stator core;
    a wedge member disposed so as to close the opening of the slot of the stator core; and
    an elastic member inserted between the stator coil and the wedge member,
    wherein said wedge member has a radial thickness formed so as to have an inclination towards an axial direction of the stator core and said elastic member is formed as a semi-cylindrical structure having a recess having an inclination towards the axial direction of the stator core.

5. A stator coil support device for an electric rotating machinery according to claim 4, wherein said wedge member has an inclination towards the axial direction of the stator core substantially between 0° and 10°.

6. A stator coil support device for an electric rotating machinery according to claim 4, wherein said elastic member has a plate structure having an inclination towards the axial direction of stator core substantially between 0° and 10°.

7. A stator coil support device for an electric rotating machinery according to claim 4, wherein said recess is formed so as to provide a semi-circular shape cross section.

8. A stator coil support device for an electric rotating machinery according to claim 4, wherein said elastic member is configured as a plate structure made of glass fiber reinforced plastic material.

9. A stator coil support device for an electric rotating machinery according to claim 4, wherein said elastic member is configured as a plate structure made of non-magnetic stainless-steel material.

10. A stator coil support device for an electric rotating machinery, comprising:
    a stator core provided with a slot having an opening;
    a stator coil installed in the slot of the stator core;
    a wedge member disposed so as to close the opening of the slot of the stator core; and
    an elastic member inserted between the stator coil and the wedge member,
    wherein said wedge member has a radial thickness formed so as to have an inclination towards an axial direction of the stator core and is provided with ratches on the inclined side, and wherein said elastic member is configured as a plate structure having a recess, in a cross-section, at a central portion thereof, flanges are provided on both sides of the recess and ratches are provided on the flanges, said flanges are formed in an inclined manner towards the axial direction.

11. A stator coil support device for an electric rotating machinery according to claim 10, wherein said wedge member has an inclination towards the axial direction of the stator core substantially between 0° and 10°.

12. A stator coil support device for an electric rotating machinery according to claim 10, wherein said elastic member has a plate structure having an inclination towards the axial direction of stator core substantially between 0° and 10°.

13. A stator coil support device for an electric rotating machinery according to claim 10, wherein said recess is formed so as to provide a trapezoidal shape in section.

14. A stator coil support device for an electric rotating machinery according to claim 10, wherein said elastic member has a plate structure made of glass fiber reinforced plastic material.

15. A stator coil support device for an electric rotating machinery according to claim 10, wherein said elastic member has a plate structure made of non-magnetic stainless-steel material.

* * * * *